United States Patent [19]

Hawkins

[11] 3,711,828
[45] Jan. 16, 1973

[54] VEHICLE ACCELERATION AND DECELERATION INDICATOR

[76] Inventor: Robert L. Hawkins, 490 South Rochester Avenue, Indianapolis, Ind. 46241

[22] Filed: Nov. 6, 1970

[21] Appl. No.: 87,467

[52] U.S. Cl. ..................340/66, 200/81.8, 340/97
[51] Int. Cl. ................................................B60q 1/50
[58] Field of Search .....340/60, 66, 71, 72; 200/81.4, 200/81.8

[56] References Cited

UNITED STATES PATENTS

| | | | |
|---|---|---|---|
| 1,270,928 | 7/1918 | Coesfeld | 200/81.8 X |
| 1,290,928 | 1/1919 | Denison | 200/81.8 X |
| 2,377,569 | 6/1945 | Morse | 340/52 UX |
| 2,683,782 | 7/1954 | Corssen | 200/81.4 |
| 3,019,415 | 1/1962 | Marion | 340/82 |
| 3,244,934 | 4/1966 | Webb | 340/67 X |
| 3,304,381 | 2/1967 | McAnespey | 340/7 UX |
| 3,395,388 | 7/1968 | Hendrickson | 340/71 |
| 2,250,133 | 7/1941 | Pearce et al. | 340/66 |

FOREIGN PATENTS OR APPLICATIONS

| | | | |
|---|---|---|---|
| 441,794 | 6/1912 | France | 200/82 |
| 1,283,239 | 12/1961 | France | 340/81 |
| 257,622 | 3/1928 | Italy | 200/81.8 |

Primary Examiner—John W. Caldwell
Assistant Examiner—Kenneth N. Lemer
Attorney—Woodard, Weikart, Emhardt & Naughton

[57] ABSTRACT

A device for indicating acceleration and deceleration of a vehicle. A Bourdon tube connected to the engine intake manifold of the vehicle has a free end movable as a result of vacuum developed within the manifold. An electrical switch operable by the free end is connected to a pair of relays. The tube, switch and relays are mounted within a box having terminal outlets connected to a source of electrical energy and to a pair of light bulbs mounted to the vehicle. One bulb energizes upon vehicle acceleration whereas the other bulb energizes upon vehicle deceleration 3 Claims, 4 Drawing Figures

PATENTED JAN 16 1973

INVENTOR
Robert L. Hawkins
By
Woodard, Weikart,
Emhardt & Naughton
Attorneys

INVENTOR
Robert L. Hawkins
By
Woodard, Weikart,
Emhardt & Naughton
Attorneys

VEHICLE ACCELERATION AND DECELERATION INDICATOR

BACKGROUND OF THE INVENTION

1. Field of the Invention

This invention is in the field of vehicle indicators; more specifically, those devices for indicating vehicle acceleration and deceleration.

2. Description of the Prior Art

Many automobile accidents are a result of rear end collisions. In many cases, the rear end collision is a result of improper warning to a driver of the deceleration of the automobile in front of his vehicle. Thus, it is desirable to provide a device on an automobile for indicating acceleration and deceleration. The following U. S. patents disclose devices for solving this problem: U.S. Pat. Nos. 2,513,712 issued to Coombs; and, Re.23,719 issued to Coombs; 3,073,922 issued to Miller; 3,320,586 issued to Wagner; and 3,492,638 issued to Lane.

The prior art devices are relatively complex being operated by various linkages and switches connected to various pedals of the vehicle, inertia elements and to the engine manifold. None of the prior art devices provide indicating means based solely and exclusively upon the change in pressure within the engine manifold. The present invention is a device which indicates the acceleration and deceleration of a vehicle and is operable exclusively by the pressure within the engine manifold.

SUMMARY OF THE INVENTION

The present invention is a vehicle acceleration and deceleration indicator. A Bourdon tube is connected to the engine manifold and has a free end movable proportionally to the pressure developed within the manifold. A first switch mounted within an indicator box has a first and second pair of electrical contacts each being operably connected to a first and second relay within the indicator box. An acceleration light is connected to and is operable by the first relay whereas a deceleration light is connected to and operated by the second relay. The indicator has an adjustment screw to control the spacing between one of the pairs of contacts.

It is an object of the present invention to provide a device attachable to a vehicle for indicating the vehicle acceleration and deceleration.

It is a further object of the present invention to provide a vehicle acceleration-deceleration indicator which operates exclusively from the pressure developed within the vehicle engine manifold.

In conjunction with the above objects, it is an object of the present invention to provide an improved vehicle acceleration-deceleration indicator which is relatively inexpensive and easy to install.

Related objects and advantages of the present invention will be apparent from the following description.

DESCRIPTION OF THE PREFERRED EMBODIMENT

Figure 1:
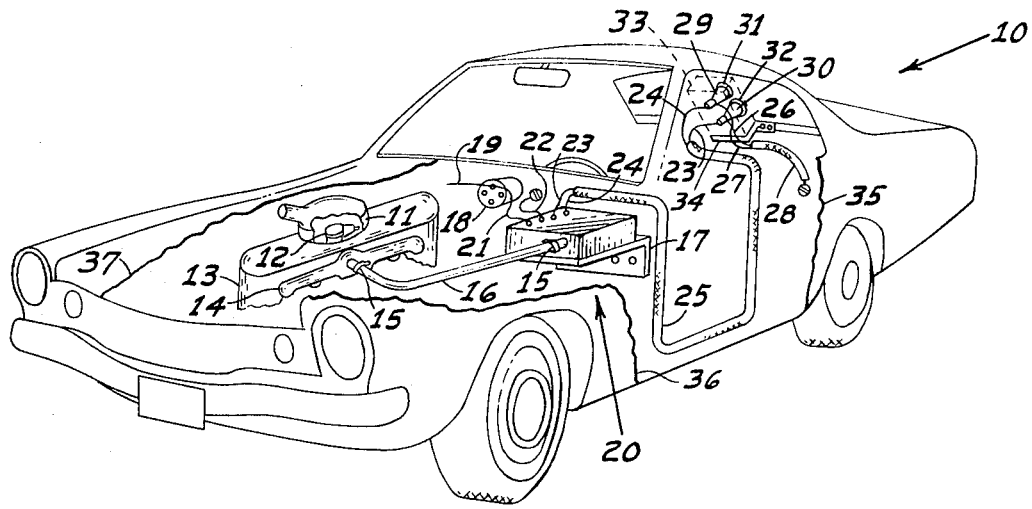
FIG. 1 is a perspective view of an automobile with portions thereof broken away to illustrate the installation of the indicator incorporating the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
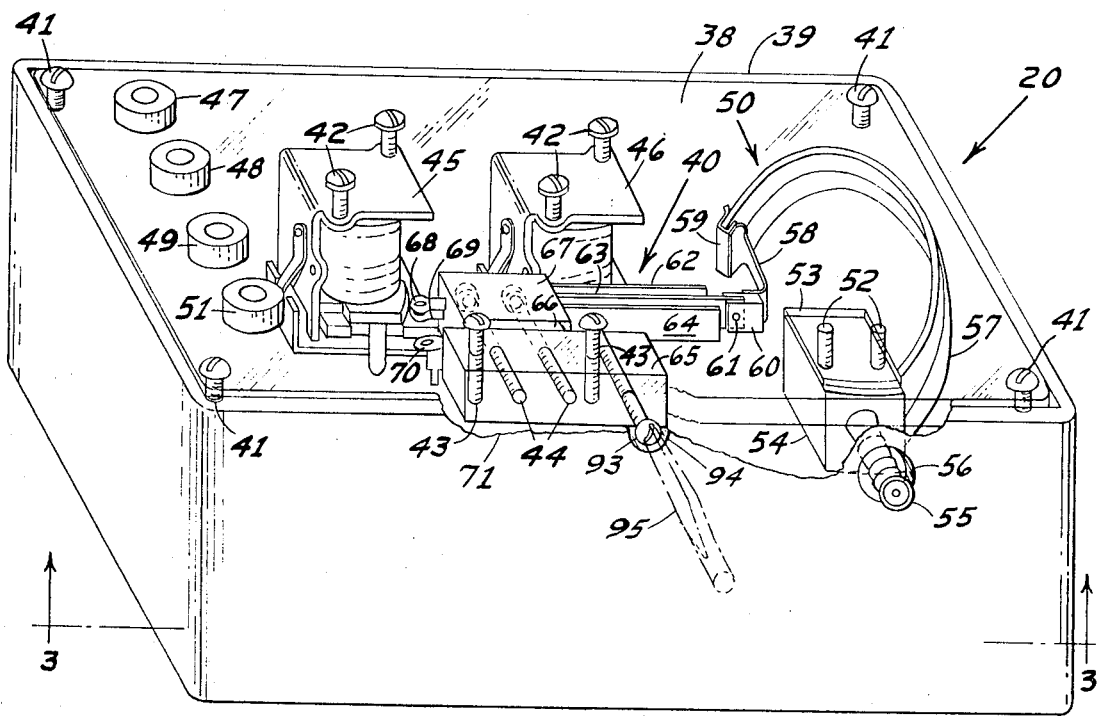
FIG. 2 is a fragmentary and enlarged perspective view of indicator box 20 shown in FIG. 1.
Figure 3:
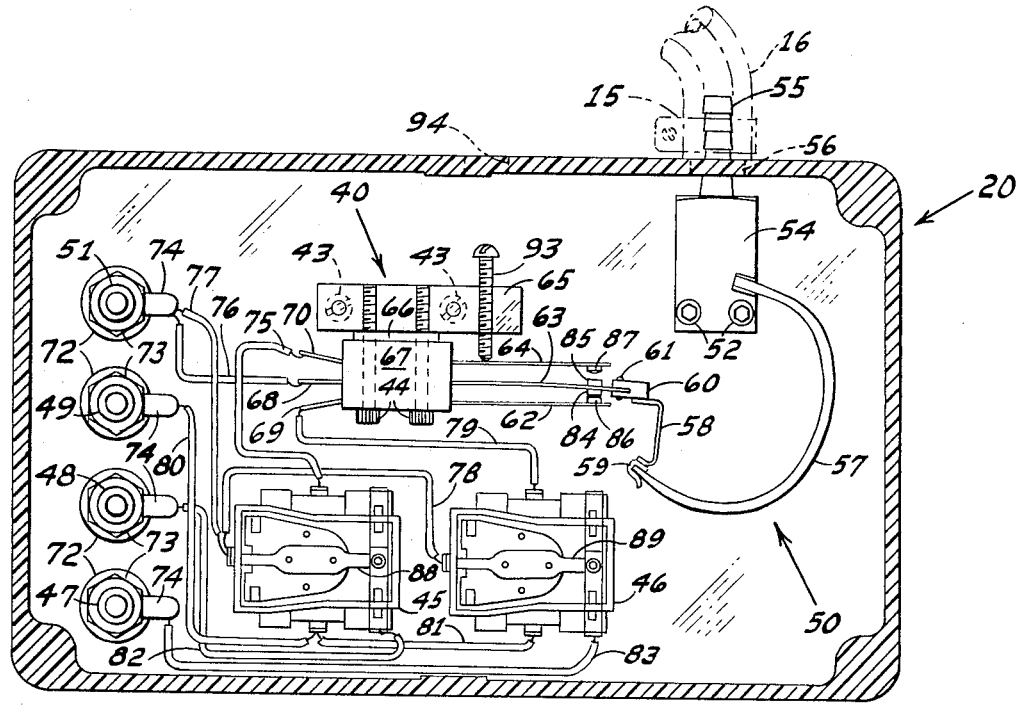
FIG. 3 is a sectional view of the indicator control box taken along the line 3—3 of FIG. 2 viewed in the direction of the arrows.

Referring now more particularly to FIG. 1, there is shown a perspective view of an automobile 10 having its hood cut away at 37 and its fender cut away at 36. In addition, a portion of the side doors are removed at 35 to more clearly illustrate the indicator incorporating the present invention. Automobile 10 has an internal combustion engine 13 with carburetor 12 and air cleaner 11. Attached to the intake manifold 14 of engine 13 is a rubber or neoprene hose 16 which is sealingly secured to an intake manifold outlet tube (not shown) by a conventional hose clamp 15. The opposite end of hose 16 is sealingly connected to indicator box 20 by a second hose clamp 15. Indicator box 20 is shown enlarged in FIG. 1 to more clearly illustrate the positioning of the box. In addition, the electrical cables 25, 28 and light enclosure 33 are shown as enlarged for illustration purposes. FIG. 2 is a perspective enlarged view of box 20. FIG. 3 is a sectional view of the box taken along the line 3—3 and viewed in the direction of the arrows of FIG. 2. Referring now to FIGS. 2 and 3, box 20 is completely closed on all of its sides and bottom being open at the top to receive transparent top wall 38. Wall 38 is secured to the thickened corners of the box by standard fastening devices 41 and is flush with top 39 of box 20. Wall 38 may be made from a material such as plastic and serves as a mounting wall for the components of the box. A pair of 12-volt DC relays 45 and 46 are mounted to wall 38 by fastening devices 42 having shanks passing freely through wall 38 being threadedly received by the relays. A portion of box 20 is removed at 71 to illustrate the configuration and mounting of block 65. Screws 43 have shanks which pass freely through wall 38 being threadedly received into rectangular plastic block 65. Switch 40 is secured to the side of block 65 by screws 44. An insulating spacer 66 is positioned between switch 40 and block 65. Fixedly mounted and extending through block 67 of switch 40 are three parallel contact springs 62, 63 and 64. Electrical terminals 69, 68 and 70 are respectively connected to springs 62, 63 and 64. Spring 63 is slightly longer than springs 62 and 64 and extends out adjacent bracket 58 of Bourdon tube assembly 50. Spring 63 is provided with a pair of electrical contacts 84 and 85. Spring 62 is provided with a single electrical contact 86 mounted adjacent contact 84. Likewise, spring 64 is provided with a single electrical contact 87 mounted adjacent contact 85. Contacts 84 and 86 are normally closed; however, the electrical continuity between contacts 84 and 86 is broken when bracket 58 forces spring 63 toward spring 64 thereby causing contact 85 to touch contact 87. Insulating block 60 is secured to the tip of spring 63 by a fastening device 61 to prevent short circuiting of spring 63 with respect to bracket 58. A contact adjustment screw 93 is threadedly received by block 65 having an end abuttable against spring 64. Adjustment of screw 93 will cause spring 64 to move with respect to spring 63. A small access hole 94 may be provided in the side wall of box 20 to allow adjustment of screw 93 with screwdriver 95. The provision of hole 94 is an optional feature of the invention and is not necessary to the operation of the invention since the adjustment may be made by removing wall 38 from the box and then turning screw 93. Hole 94 should be sealed to prevent entrance of moisture and dust which could contaminate the electrical contacts.

Mounted to wall 38 by fastening devices 52 is Bourdon tube assembly 50. Fastening devices 52 are threadedly received by block 54 which has a hollow interior communicating with nozzle 55 and tube 57. A spacer 53 is positioned between block 54 and wall 38 to insulate the block from the top wall. Nozzle 55 extends out through hole 56 provided in the side wall of box 20. Sealing material such as adhesive should be used to seal hole 56 to prevent contaminants from entering the box. Tube 57 is bowed being completely hollow from block 54 to the end of the tube adjacent bracket 58. The tip of tube 57 is sealed and received by channel 59 fixedly fastened to bracket 58. Bourdon tubes are well known and thus further elaboration thereon by this specification would be superfluous. Suffice it to say that a decrease in air pressure within block 54 will result in movement of the free end of tube 57 and bracket 58 toward spring 63 thereby causing spring 63 to move toward spring 64. On the other hand, an increase in air pressure within block 54 and tube 57 will result in movement of the free end of tube 57 and bracket 58 away from spring 63 allowing the electrical contact between contacts 87 and 85 to be broken with the reestablishment of the normally closed contact between contacts 84 and 86.

Hollow terminal posts 47, 48, 49 and 51 (FIG. 2) are mounted atop wall 38 each having threaded shanks extending through wall 38 and threadedly receiving hexagonally shaped nuts 73. Insulating washers 72 are positioned between wall 38 and nuts 73. In addition, electrical terminal lugs 74 are mounted to the terminal posts being positioned between nuts 73 and insulating washers 72. Posts 47, 48, 49 and 51 are quite standard being hollow to receive a male terminal. Post 47 (FIG. 4) is connected by wire 24 to light 29 connected to a suitable ground by wire 27. Terminal 48 is connected to light 30 by wire 23 and also is connected to a suitable ground by wire 26. Wires 23 and 24 are routed via cable 25 (FIG. 1) to lights 29 and 30 mounted in the rear window of the automobile. A suitable light bracket enclosure 33 is provided and is shown enlarged in FIG. 1 for illustrative purposes. In actual use, the light and bracket would take up only a small portion of the rear window. Lights 29 and 30 have a green lens 31 and a yellow lens 32 secured thereto. Ground wires 26 and 27 are enclosed in cable 28 and are electrically connected to a suitable ground such as the frame of the automobile. Bracket 34 secures enclosure 33 to the rear window frame or window seal. A second bracket 17 mounted to the fire wall of the automobile has the indicator box 20 mounted thereon. Post 49 (FIG. 4) is connected to ground by wire 22 while post 51 is connected to ignition switch 18 by wire 21 and is thereafter connected to battery 92 by wire 19.

Figure 4:
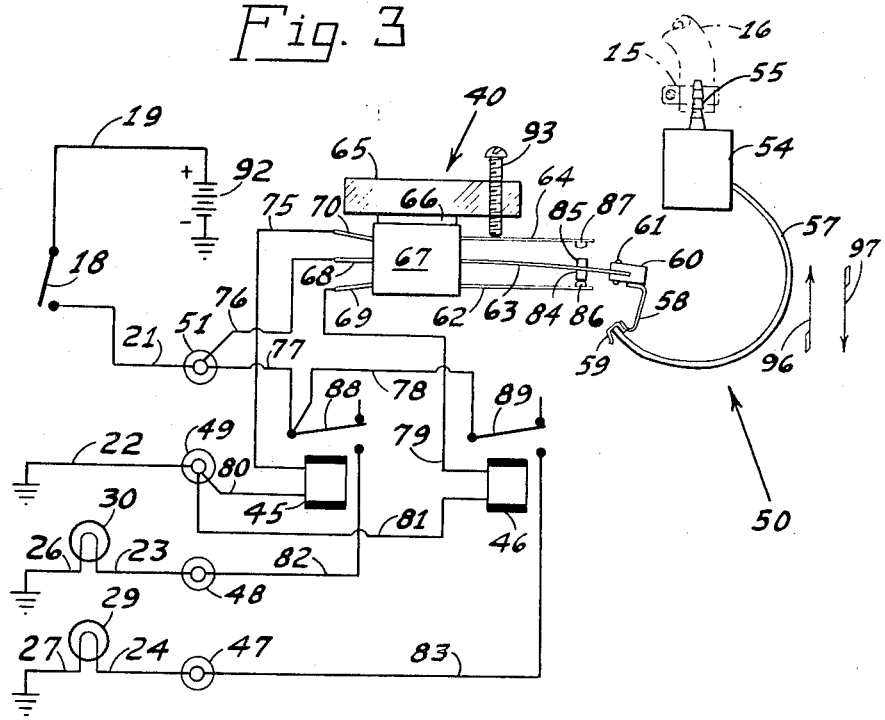
FIG. 4 is a schematic diagram of the electrical circuitry of an indicator incorporating the present invention.

The operation of the present invention will now be described by referring specifically to FIGS. 1 and 4. When the ignition switch 18 is in the open position, electrical energy from battery 92 is prevented from flowing to the indicator and thus both the green and yellow lights are not energized. In addition, contacts 84 and 86 are in an abutting relationship. Upon closing of the ignition switch 18, current flows from battery 92 via wire 19 through ignition switch 18 and to post 51 via line 21. Current flows from post 51 through wire 76, lug 68 and contacts 84 and 86. The current flowing through the contacts is then routed via lug 69 and wire 79 to relay 46 causing arm 89 to close to the contact connected to wire 83. Current then flows via wire 77 through arm 89 and wire 83 energizing green light 29. After the engine has started and is idling, the pressure within tube 57 drops below atmospheric pressure causing the free end of tube 57 and bracket 58 to move in the direction of arrow 96 forcing spring 63 to the center position interrupting the flow of current through contacts 84 and 86. The coil of relay 46 is then unenergized preventing the flow of current to green light 29. Upon acceleration of the automobile, the pressure within tube 57 will increase sufficiently so as to cause the free end of tube 57 and bracket 58 to move back in the direction of arrow 97 again closing contact 84 with contact 86 thereby turning on the green light. When the automobile is decelerating the pressure within tube 57 will decrease causing the free end of tube 57 and bracket 58 to move in the direction of arrow 96 until contacts 85 and 87 are in an abutting relationship. This routes current from spring 63 through spring 64, lug 70 and wire 75 to relay coil 45. The movable arm 88 of relay 45 will then close up on the contact connected to wire 82 providing for the flow of current through wires 77 and 82 energizing yellow light 30. Relays 45 and 46 are connected to ground, respectively, by wires 80 and 81. The spacing between contacts 85 and 87 may be adjusted with screw 93 thereby controlling the point at which yellow light 30 is energized. For example, by retracting screw 93 thereby increasing the gap between contacts 85 and 87, a relatively greater amount of vacuum or lower pressure within the intake manifold will be required to force contact 85 to abut contact 87. On the other hand, by decreasing the gap between contacts 85 and 87 by adjusting screw 93 inwardly, a relatively smaller vacuum or higher pressure will be required in the intake manifold to force the contacts 85 and 87 to mate. Thus, the yellow light will energize at a relatively slight deceleration.

It will be obvious from the above description that the present invention provides a device for attachment to a vehicle for indicating vehicle acceleration and deceleration. It will be further obvious from the above description that the present vehicle indicator operates exclusively from the vacuum developed within the engine manifold. In addition, it will be obvious that the indicator is relatively inexpensive and easy to install.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A device connectable to a vehicle engine manifold for indicating acceleration and deceleration of the vehicle comprising:

a Bourdon tube connectable to said manifold having a free end movable proportionally to pressure developed within said manifold;

a first switch having a first contact and a second contact and a first spring member extending therebetween, said member being engaged with and movable by said free end and having a third contact opposite said first contact and a fourth contact opposite said second contact, said first and third contacts and said second and fourth contacts being opened and closed by movement of said member;

second switch means operably connected to said first switch;

third switch means operably connected to said first switch;

an acceleration light connected to and operable by said second switch means; and, a deceleration light connected to and operable by said third switch means; and wherein:

said first and third contacts are open when said vehicle is accelerating, said second and fourth contacts are closed only when said vehicle is accelerating;

said third and fourth contacts are connected via said member to a source of electrical energy;

said second switch means is operably connected to said second contact; and, said third switch means is operably connected to said first contact; and wherein:

said first switch has a second spring member with said first contact mounted thereon and additionally comprising:

adjustment means operable to move said second spring member to change the spacing between said first and third contacts.

2. The indicator of claim 1 wherein:

said second means is a relay with a coil and contacts, said coil is operably connected to said second contact and one of said contacts of said second means is connected to said acceleration light; and, said third means is a relay with a coil and contacts, said coil of said third means is operably connected to said first contact and one of said contacts of said third means is connected to said deceleration light.

3. The indicator of claim 2 wherein:

said first and third contacts are normally opened and said second and fourth contacts are normally closed;

said free end of said Bourdon tube is connected to said first spring member; and, said first switch has a third spring member with said second contact mounted thereon, said first, second and third spring members are leaf springs.

* * * * *